March 24, 1970 A. H. SIMMONS ET AL 3,502,079
CHICKEN DEBEAKER AND INOCULATOR
Filed Oct. 31, 1966
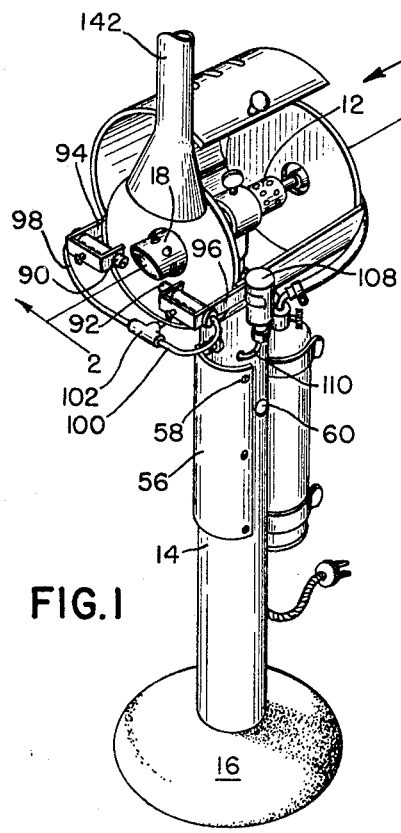
FIG.1
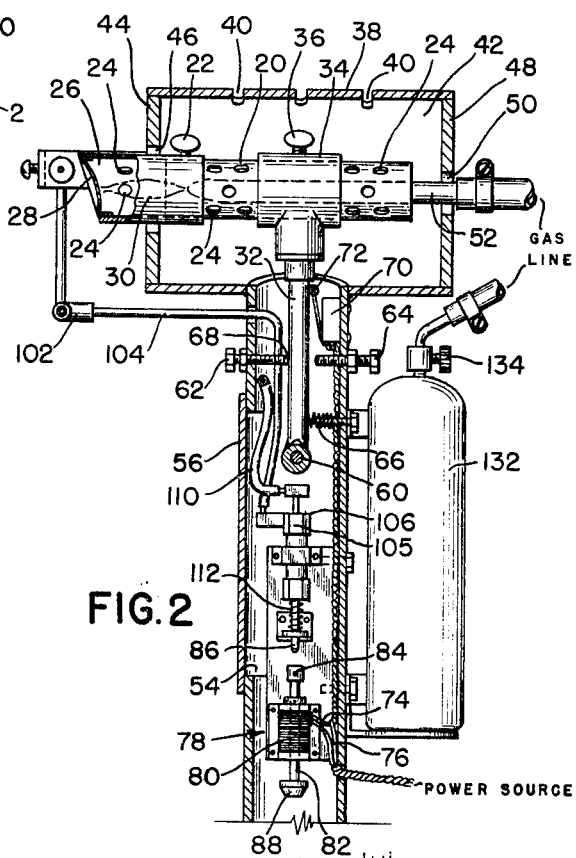
FIG.2
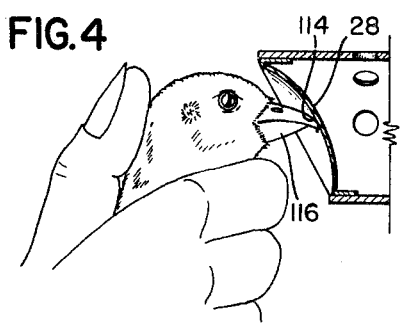
FIG.4
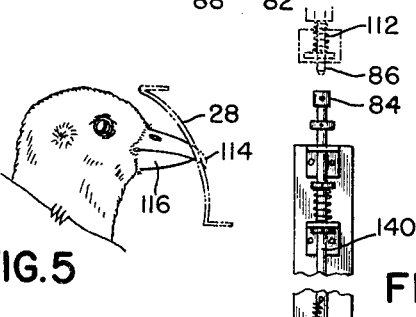
FIG.5 FIG.3
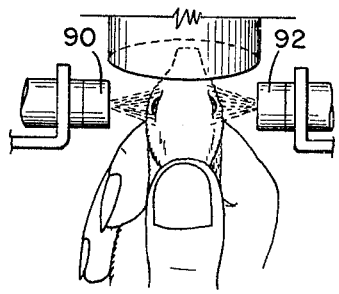
FIG.6
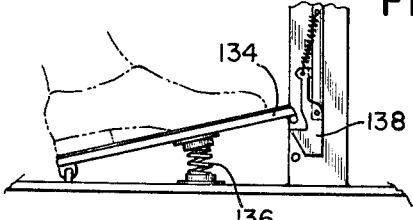
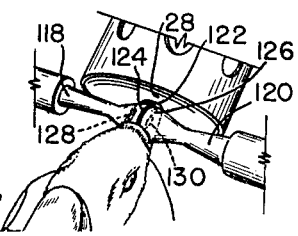
FIG.7
INVENTORS
AUGRUM H. SIMMONS
EDWIN H. WILLIAMSON

United States Patent Office 3,502,079
Patented Mar. 24, 1970

3,502,079
CHICKEN DEBEAKER AND INOCULATOR
Augrum H. Simmons and Edwin H. Williamson, Graham, N.C., assignors to Edwin H. Williamson, Graham, N.C.
Filed Oct. 31, 1966, Ser. No. 590,645
Int. Cl. A61b 17/20, 17/36; A61d 7/00
U.S. Cl. 128—253          11 Claims

ABSTRACT OF THE DISCLOSURE

A debeaking and inoculating apparatus for chickens in which a beak-engaging element is heated by a flame to a temperature adequate for burning a chicken beak and a vaccine dispensing unit for discharging vaccine spray against the chicken head during chicken beak burning.

This invention relates generally to equipment for treating chickens and particularly it relates to an apparatus for debeaking and inoculating baby chicks in one operation.

The growth and development of the chicken industry during the past several years has required that considerable research be conducted of chicken diseases and their cure, since heretofore a significant percentage of baby chicks did not survive the incubation and early growth periods because of physical infirmities, peculiar characteristics and contagious diseases. As an example, baby chicks are curiously attracted to spots or specks of foreign matter assuming it to be food and will incessantly peck away at this material until it disappears or they are precluded from continuing by some other reason. Thus when chicks accumulate dirt and dust particles on their bodies, this unexplainable habit causes surrounding chicks to peck away at the particle-carrying bird until the flesh is punctured and the bird is irreparably damaged or killed. Once the pecking has commenced, and blood appears, the surrounding chicks are thus stimulated by the additional blood specks and the activity is substantially increased thus providing little chance of recovery for the damaged bird.

Because of this peculiar characteristic of baby chicks, it has long been the practice to perform a debeaking operation on the birds at an early age to remove an arcuate portion from the upper half of the chicken beak, first, to dull the natural point of the beak so that such pecking is relatively ineffective to damage the particle-carrying chick, and second, to make the beak somewhat sensitive and thus deter the chicken from incessantly pecking because of the painful consequences. Obviously, the removal of this element of danger to the baby chick is beneficial in that few of the chickens, regardless of their particle-carrying characteristics, are subjected to this pecking, and thus the possibility of extended life is increased.

Numerous diseases befall baby chicks unless particular methods are adopted, and it has long been the practice to vaccinate all classes of chickens against such diseases, particularly New Castle disease and infectious bronchitis, by a number of oral methods. Three particular locations on the body of the baby chick are recommended for oral inoculation and these include the throat, the nostrils and the eyes. Chicken eyes are unusually susceptible to the introduction of a fluid since they float within a sea of aqueous solution filling a cavity which allows rapid application of vaccine or other materials directly into the chicken bloodstream.

Various techniques are available for inoculating baby chicks, and these include forcing the chick's beak apart and introducing vaccine into the chicken's throat, using an eye dropper or syringe to introduce vaccine directly into the chicken's nostrils and using a variety of atomizing devices to direct a spray against the chicken's eyes and very rapidly into the bloodstream. All of these methods are acceptable procedures though some are better than others because of a lesser likelihood of damage to the chicken during the inoculation. For example, forcing the chick's beak apart to inject vaccine through the mouth is somewhat dangerous in that there is some possibility of crushing the chick's skull because an inoculator would be required to press against the back of the chicken's head in order to force his beak apart. At the very early age which vaccination usually occurs, the chicken's skull is extremely soft and quite susceptible to damage during such an operation. Additionally, unless the chicken's tongue is precisely positioned to allow the vaccine to flow down the chick's throat, there is likelihood that the vaccine will not pass into the body.

Inoculation through the nostrils is oftentimes not effective because the chick must breathe during the application of the vaccine so that it will be drawn into the body. This requires exact positioning of a syringe or eye dropper directly over the chick's nostril, and it also requires that the chick breathe precisely at the moment the vaccine is applied.

From a practical standpoint, vaccination through the chicken's eyes is the most effective and the most expeditious since vaccination through the mouth or nostrils requires manipulation of the chick by an attendant and precise positioning of the instruments to be used for vaccination. An atomized spray against the eyes is extremely effective since the particular characteristics of the chicken's eyes allows this spray to be introduced in and around the eye into the cavity therebehind and directly into the bloodstream. Thus there is no requirement that a particular instrument be precisely positioned prior to vaccination but only that the instrument be proximate the eye when the spray is applied.

With the above procedures in handling baby chicks in mind, the present invention contemplates combining two of the chick treating techniques on a single apparatus by a single operator so that the two operations can be accomplished with a tremendous savings in time and effort over that heretofore required.

Basically, the present invention comprises an apparatus for debeaking and inoculating baby chicks which is generally supported by a stand or stanchion and has a particularly shaped element heated by some source for applying the top arcuate portion of the chicken's beak thereagainst so as to perform the debeaking operation in a very rapid manner. Additionally, the apparatus contains a vaccine source and spraying means associated with that source so that once the chicken's beak comes in contact with the debeaking shield, the element and associated heat source is slightly displaced and thus operates a vaccine spraying means which automatically introduces spray about the chicken's eyes at a position near the beak-engaging element. The apparatus thus has the advantage of introducing vaccine spray at exactly the same position during each operation so that the chicken's eyes are completely covered with spray on either side and the debeaking and inoculating procedure is accomplished in one step.

With the above features of baby chick care and treatment in mind, and the basic essentials of the present apparatus set forth, it is, therefore, a primary object of the present invention to provide a chick debeaking and inoculating apparatus for simultaneously removing an arcuate portion of the chick's beak and vaccinating the chicken through a body opening.

Another object of the present invention is to provide a chick debeaking and inoculating apparatus which avoids duplicate handling of the baby chick by an operator and accomplishes the debeaking and vaccinating procedure in one step.

A further object of the present invention is to provide a chicken debeaker and inoculating apparatus which accomplishes both the debeaking and vaccinating operation in a fraction of the time heretofore required in achieving these same results.

Still another object of the present invention is to provide a chicken debeaking and inoculating apparatus which can be automatically operated to introduce vaccine into the chicken's bloodstream contemporaneously with the debeaking of the chick or which can be manually operated to introduced vaccine into the chick's bloodstream at any other desired moment during the debeaking operation.

Yet another object of the present invention is to provide a chicken debeaking and inoculating apparatus which can be operated as a portable unit by the use of a DC supply source or as a permanently installed unit by the use of a conventional AC power supply.

Yet a further object of the present invention is to provide a chicken debeaking and inoculating apparatus that can be utilized to apply vaccine to the chickens contemporaneously in either the chicken's eyes or nostrils with equal effectiveness.

Yet still another object of the present invention is to provide a chicken debeaking and inoculating apparatus that is extremely simple in construction, readily accessible for maintenance and economical in cost.

Yet still a further object of the present invention is to provide a chicken debeaking and inoculating apparatus which utilizes a debeaking or beak-engaging element that will last considerably longer than those heretofore known by virtue of the application of heat from a remote heat source rather than from the direct heating of that element as a component of an electrical circuit.

These and other objects of the present invention will become more apparent from a consideration of the following detailed specification and the accompanying drawings constituting a part hereof in which like characters of reference designate like parts throughout the several views and in which:

FIG. 1 is a perspective view of the preferred embodiment of the present invention showing the heat source and beak-engaging element positioned near the vaccine spraying means, these components all supported on a stanchion mounted a convenient distance above an operating surface;

FIG. 2 is a side elevational, sectional and fragmented view of the debeaking and inoculating apparatus of FIG. 1 showing the pivotal mounting of the burner in conjunction with the beak-engaging element along with the positioning of the vaccine spraying means and the operational features thereof;

FIG. 3 is a side elevational, sectional, and fragmented view of the foot pedal apparatus for dispensing vaccine manually and selectively by an operator which constitutes an alternative embodiment of the vaccine supplying apparatus of the present invention;

FIG. 4 is a side elevational, sectional and fragmented view of a chick with its beak placed against the beak-engaging element of the present invention prior to the searing of the beak during the debeaking operation;

FIG. 5 is a side elevational and fragmented view of a chick's beak positioned against the beak-engaging element of the present invention after the beak has been seared along the top arcuate portion illustrating by dotted lines the amount of beak removed during the debeaking operation;

FIG. 6 is a top, fragmented and sectional view of the positioning of a chick with its beak placed against the heat-engaging element of the present invention and the simultaneous application of spray from the spray-dispensing means positioned near that element; and FIG. 7 is a perspective and fragmented view of a chick's beak positioned against the beak-engaging element with the vaccine dispensing means designed to engage the beak and apply vaccine directly into the chick's nostrils rather than its eyes.

Referring now to the drawings and particularly to FIG. 1, there is shown a debeaking and inoculating apparatus for chickens generally designated 10 comprising a burner 12 supported from within a tubular column 14 which is maintained in a substantially vertical and upright position by securement to a floor plate 16 or other suitable sustaining member. A burner cap 18 slides over the forward portion 20 of burner 12 and is positioned with respect thereto by means of an adjustable setscrew 22 or other suitable securing measures. The burner 12 and cap 18 are provided with a number of apertures 24 to allow dissipation of accumulated heat and thus avoid the destruction of the physical characteristics of these particular members.

Cap 18 is closed at its forward end 26 with a beak-engaging element 28 which is capable of sustaining extremely high temperatures and which is positioned in close proximity with the flame 30 emitted from burner 12. Element 28 is substantially convex in shape and adapted to engage the beak of a chicken along an upper arcuate portion (later to be described) so that a portion of the beak will be removed by the searing action of the heated element 28.

Burner 12 is releasably secured to an upright supporting member 32 by means of a clamp 34 designed to permit burner adjustability therein by means of a setscrew 36 carried thereby. A support housing 38 generally surrounds the burner and has a number of vents 40 which permit the passage of accumulated heat from within the interior 42 of housing 38.

The housing is preferably made of a fire-retardant material such as asbestos or the like and is closed by a forward portion 44 having an aperture 46 therein to accommodate cap 18 as it moves slightly within preselected limits without actually engaging the cap 18. Similarly, a rearward end portion 48 contains a centered aperture 50 which tolerates the slight movement of the burner fuel line 52.

Member 14 houses a number of circuit components and mechanisms to provide efficient operation of the described apparatus and preferably contains an opening 54 selectively closed by a plate 56 which is held in position by a number of screws 58.

Inside member 14, burner support rod 32 is pivotally retained by a pin 60 extending transversely through the midportion of member 14 so that burner 12 is pivotal about point 60 when held by member 32 and clamp 34. Two setscrews 62 and 64 are positioned through the walls of member 14 in an adjustable manner so as to limit pivotal movement of member 32 and the carried burner 12 about pivot point 60 upon adjustment. It is considered to be a preferable adjustment to have member 32 substantially vertical by the positioning of setscrew 62 when in its forward position and then to provide a compression spring 66 on the rearward side of member 32 so as to continually bias the member and carried burner forwardly against the end 68 of setscrew 62.

Thus the entire burner assembly including the fuel line 52 and the beak-engaging element 28 moves in unison upon displacement of any associated component by an outside force. Apertures 46 and 50 allow displacement of the burner 12 and cap 18 between limits controlled by setscrews 62 and 64 without binding the cap or fuel line 52 against the end portions 44 and 48 of housing 38.

In the preferred embodiment, microswitch 70 is mounted rearwardly of member 32 so that its trip arm 72 is displaced to energize the switch upon rearward movement of member 32 and the carried burner 12. Displacing trip arm 72 closes the circuit formed by the dual leads 74 and 76 leading from a conventional power source and actuates a solenoid generally designated 78 by energizing its coil 80 and displacing its armature 82 upwardly so that an armature-carried hammer 84 is positioned sharply against a plunger 86, the precise operation of which will be subsequently described in detail. A weight 88 attached to the lower end of armature 82 causes the armature to be pulled downwardly to a lowermost position as soon as the circuit established by leads 74 and 76 and closed microswitch 70 is broken by the displacement of member 32 and the movement of trip arm 72 to open switch 70.

The inoculating attachment of the present invention consists of a number of spray nozzles designated 90 and 92 supported by suitable brackets 94 and 96 adhered to the housing 38 of apparatus 10 so that these nozzles are generally directed inwardly about the beak-engaging element 28. The vaccine lines 98 and 100 extend from the nozzles and are joined at a coupling 102 to form a single feed line 104 etending to a check valve 106. A receptacle 108 of vaccine or other appropriate medicine is positioned exteriorly of member 14 in an inverted position so that the vaccine may be displaced by either suction or gravity down through another tubular member 110 into the accumulating chamber 105 of check valve 106. The valve is of a conventional make and model and provides for the accumulation of a predetermined amount of fluid within the chamber which can be selectively discharged in spray or mist form by means of abrupt movement of plunger 86 such as is accomplished when hammer 84 is displaced by the operation of solenoid 78. A spring 112 carried about plunger 86 insures that the shaft is returned to a starting position after each displacement of the plunger by hammer 84 which is turn discharges a predetermined amount of vaccine through tubular member 104 and nozzles 90 and 92 in atomized form.

Nozzles 90 and 92 are mounted in a position to generally dispense spray about the chicken's head as it is positioned therebetween in a manner to place the beak against the beak-engaging element 28 of cap 18. The chicken is placed near the beak-engaging element 28 in a manner such as that illustrated in FIG. 4 so that the upper arcuate portion 114 of the chicken's beak which extends slightly beyond the lower portion 116 can be seared by that element and thus removed. The chicken's head is positioned firmly against the element 28 whose temperature quickly sears the upper beak portion in a manner such as that particularly shown in FIG. 5 so that portion is removed without any discomfort or pain to the chicken in a manner very similar to that of removing fingernails or toenails of a human being. Because of the high temperature at which element 28 is maintained, the searing step requires only a fraction of a second and the chicken is quickly released by the operator, falls to the ground and scrambles away.

In combining the operation of the debeaker with the inoculator, the spray nozzles 90 and 92 are positioned so that when the chicken beak upper portion 114 contacts element 28, burner 12 is displaced ever so slightly according to the positioning of setscrew 64 and microswitch 70 is closed to energize the vaccinating circuit, thus causing the dispensation of vaccine in spray form through nozzles 90 and 92 into the chicken's eyes such as shown in FIG. 6. Obviously, the adjustability of nozzles 90 and 92 will permit the introduction of vaccine spray precisely into the chicken's eyes after a few operations particularly when adjusted in cooperation with setscrews 62 and 64.

As has been previously mentioned, accepted body openings for the introduction of vaccine into chickens which have been used commercially include the nostrils and it is obviously well within the capabilities of the present invention to slightly alter the configuration and positioning of the spray nozzles to provide tapered spouts 118 and 120 as shown in FIG. 6 so that the upper portion 122 of the chicken beak will nest within the cooperating ends 124 and 126 of members 118 and 120. Thus upon actuation of the vaccinating circuit, vaccine is introduced directly into the nostrils 128 and 130 as the chicken is held with its beak against the beak-engaging element 28.

As can be clearly shown in the drawings and set forth in the above description, the present apparatus can be operated considerably faster than any device of a conventional nature designed to accomplish only one of the two operations, i.e., debeaking or vaccination of young chickens. Unquestionably, the time within which both operations are accomplished by the present apparatus cannot be equaled by conventional means. It is also found that by the use of bottle gas such as held within container 132 and dispensed therefrom in a controlled manner by valve 134, the disadvantages of electrical element heating are overcome and the beak-engaging element 28 can last from 20 to 50 times longer than conventional elements which are heated by electricity.

The use of bottled gas and the interchangeability of solenoid 78 for a direct current solenoid makes the present apparatus completely portable in nature if such is desired. A battery supply capable of operating a direct current solenoid 78 could be contained within the lower portion of member 14 if such were necessary. It is even contemplated that dual solenoids for displacing the same hammer such as 84 shown in FIG. 2 could be mounted in a side-by-side relationship, one operating from alternating current which could function from a conventional 120 volt supply and the other operating from a DC source that could be maintained within the base of the machine.

If purely mechanical operation is required and high production capacity is not of prime consideration, the vaccine dispensing mechanism can be manually operated as shown in FIG. 3. There a hammer 84 is displaced by means of a foot pedal 134 which is continuously upwardly urged by a spring 136. The operator simply depresses pedal 134 so that cam 138 is lowered and displaces plunger 140 in that direction. At the time vaccine application is required, the operator merely lifts his foot quickly from the pedal 134 and plunger 140 displaces hammer 84 into contact with shaft 86 of a check valve apparatus such as shown in FIG. 2 and operated with the preferred solenoid-carried embodiment.

As the searing of the chicken beak causes extremely unpleasant odors in the immediate vicinity of the operator, it has been found advantageous to provide an exhaust stack 142 such as shown in FIG. 1 so that the fumes from the searing operation are carried, along with the emitted hot air, upwardly through the stack and remote from the nostrils of the operator and those positioned nearby.

What is claimed is:

1. A debeaking and inoculating apparatus for chickens comprising: support means; a heat source for supplying fuel for a direct flame held by said support means; a beak-engaging element capable of heat conduction positioned adjacent a direct flame from said heat source for engaging the beak and debeaking by burning an arcuate portion thereof; oppositely directed vaccine dispensing means positioned for dispensing vaccine against opposite sides of a chicken head positioned proximate said beak-engaging element; and means for actuating said vaccine dispensing means to eject vaccine so that vaccine is introduced into the chicken body contemporaneously with the burning of the chicken beak.

2. A debeaking and inoculating apparatus as claimed in claim 1 further comprising means for selectively actuating said vaccine dispensing means.

3. A debeaking and inoculating apparatus as claimed in claim 1 further comprising means operable with said beak-engaging element for actuating said vaccine dispensing means upon engagement and movement of said element by the chicken beak.

4. A debeaking and inoculating apparatus as claimed in claim 1, said vaccine dispensing means including spray means capable of directing a vaccine spray against the chicken head.

5. A debeaking and inoculating apparatus as claimed in claim 3. said vaccine dispensing means including spray means capable of directing a vaccine spray against the chicken head upon engagement of said element by the chicken beak.

6. A debeaking and inoculating apparatus as claimed in claim 2, said actuating means including a microswitch positioned adjacent said beak-engaging element, said element being displaceably responsive to contact with the chicken beak, and an actuating solenoid operable with said microswitch for actuating said vaccine dispensing means to emit vaccine against the chicken head upon engagement and displacement of said element by the chicken beak.

7. A debeaking and inoculating apparatus as claimed in claim 2, said heat source including a gas fired burner pivotally supported between limits, said beak-engaging element releasably secured to said burner and pivotal therewith, said burner and element movable from a front to a rearward position in response to contact with the chicken beak and from the rear to the front position when the chicken is removed from said element.

8. A debeaking and inoculating apparatus as claimed in claim 3, said heat source including a gas fired burner pivotally supported between limits, said beak-engaging element releasably secured to said burner and pivotal therewith, said burner and element movable from a front to a rearward position in response to contact with the chicken beak and from the rear to the front position when the chicken is removed from said element.

9. A debeaking and inoculating apparatus as claimed in claim 4, said spray means positioned to inject spray into the chicken eyes when the chicken beak engages the beak-engaging element.

10. A debeaking and inoculating apparatus as claimed in claim 4, said spray means positioned to inject spray into the chicken nostrils when the chicken beak engages the beak-engaging element.

11. A debeaking and inoculating apparatus as claimed in claim 5, said actuating means including a microswitch positioned adjacent said beak-engaging element, said element being displaceably responsive to contact with the chicken beak, and an actuating solenoid operable with said microswitch for actuating said vaccine dispensing means to emit vaccine against the chicken head upon engagement of said element by the chicken beak, said heat source including a gas fired burner pivotally supported between limits, said beak-engaging element releasably secured to said burner and pivotal therewith, said burner and element movable from a front to a rearward position in response to contact with the chicken beak and from the rear to the front position when the chicken is removed from said element, said vaccine dispensing means including spray means capable of directing a vaccine spray against the chicken head.

References Cited

UNITED STATES PATENTS

| | | | |
|---|---|---|---|
| 1,763,894 | 6/1930 | Lagier | 128—303.1 |
| 2,505,559 | 4/1950 | Lyon | 128—303.1 |
| 2,722,219 | 11/1955 | Hiester | 128—305 |
| 2,731,016 | 1/1956 | Miller | 128—303.1 |
| 2,798,835 | 7/1957 | Markham. | |
| 3,302,645 | 2/1967 | Lockmiller | 128—305 XR |
| 3,434,474 | 3/1969 | Reynolds | 128—253 |

RICHARD A. GAUDET, Primary Examiner

R. L. FRINKS, Assistant Examiner

U.S. Cl. X.R.

128—173, 303.1